United States Patent
Ravid et al.

(10) Patent No.: US 6,502,496 B1
(45) Date of Patent: Jan. 7, 2003

(54) ARMOR SYSTEM FOR FLEXIBLE CABLES AND CONDUITS

(76) Inventors: Moshe Ravid, 8b Simtat Hayerek, Hod Hasharon (IL), 45264; Yoav Hirschberg, Kibbutz Sasa, Mobile Post Maron Hagalil (IL), 13870

(*) Notice: Subject to any disclaimer, the term of this patent is extended or adjusted under 35 U.S.C. 154(b) by 0 days.

(21) Appl. No.: 09/422,989

(22) Filed: Oct. 22, 1999

(30) Foreign Application Priority Data

Oct. 22, 1998 (IL) ................................................ 126712

(51) Int. Cl.$^7$ ................................................ F41H 5/02
(52) U.S. Cl. ................ 89/36.02; 138/120; 138/137; 138/138; 138/139; 138/140; 138/148
(58) Field of Search ............ 89/36.01; 138/120, 138/118, 118.1; 285/261

(56) References Cited

U.S. PATENT DOCUMENTS

| | | | |
|---|---|---|---|
| 1,451,800 A | * 4/1923 | Agner | |
| 3,695,646 A | * 10/1972 | Mommsen | |
| 4,093,004 A | 6/1978 | Kile et al. | 138/140 |
| 4,529,640 A | 7/1985 | Brown et al. | 428/116 |
| 4,739,801 A | 4/1988 | Kimura et al. | 138/120 |
| 4,836,084 A | 6/1989 | Vogelesang et al. | 89/36.02 |
| 4,868,040 A | 9/1989 | Hallal et al. | 428/251 |
| 4,948,673 A | 8/1990 | Goeury | 428/425.8 |
| 5,143,123 A | * 9/1992 | Richards et al. | |
| 5,449,206 A | * 9/1995 | Lockwood | |
| 5,997,047 A | * 12/1999 | Pimentel et al. | |

FOREIGN PATENT DOCUMENTS

| | | |
|---|---|---|
| DE | 34635 | 7/1885 |
| DE | 28 55 694 | 7/1980 |
| EP | 0 788 759 A2 | 8/1997 |
| GB | 2 306 630 | 5/1997 |

* cited by examiner

Primary Examiner—Charles T. Jordan
Assistant Examiner—Troy Chambers
(74) Attorney, Agent, or Firm—Morgan, Lewis & Bockius LLP

(57) ABSTRACT

The invention provides an armor system for ballistic protection of a flexible conduit, the system comprising a plurality of protective tubular elements in axial alternating array with double-socket joint elements, the outer peripheral ends of the tubular elements being provided with a convex curvature complementary to a concave curvature provided along the inner peripheral ends of the double-socket joint elements, a protective tubular element being inserted in each end of the double-socket joint elements, the curved peripheral end allowing any tubular element connected to a double-socket element to till freely relative thereto.

7 Claims, 1 Drawing Sheet

ARMOR SYSTEM FOR FLEXIBLE CABLES AND CONDUITS

The present invention relates to a ballistic protection of flexible wires, cables, conduits and the like, hereinafter referred to as conduits for brevity sake.

More particularly, the invention provides armor tubes and swivel joints which can be assembled axially in an alternate array to armor a flexible conduit such as for example a fluid power hose.

Vehicles used on land, sea or in the air (protected platforms) often include exposed flexible conduits, for example lines carrying hydraulic, pneumatic or electrical power, gases, fluids, i.e. water or cooling fluids. Many such lines are essential for the functioning of the vehicle, and if damaged could place the vehicle or at least its current mission into jeopardy. Armored vehicles, military and even some types of civilian vehicles thus require that such conduits, if not protected by the armor enclosing the rest of the vehicle, be provided with their own protection.

Most armor is rigid, and thus cannot be used to surround a conduit that must flex, as for example conduits connected to the folding landing gear of an aircraft.

The provided armor is designed to protect against a specified threat level, and is suited to the type, power, speed and weight of the vehicle to be protected. Obviously the type of armor found on tanks and battleships cannot be carried by light road vehicles or small boats; conversely light vehicles cannot be expected to survive being hit by an anti-tank missile. The selected weight of armor for vehicles is always a compromise between a higher level of protection causing reduced vehicle mobility, range and speed and a lower level of protection, together with mobility close to that of an unarmored vehicle.

The weight of armor is detrimental to the speed, maneuverability, maintenance costs, fuel consumption and range of motorized vehicles.

Examples of armor systems intended to provide adequate protection without excessive weight are found in U.S. Pat. Nos. 4,529,640, 4,836,084 and 4,868,040.

Flexible conduits projecting beyond the normal envelope of the vehicle armor have in the past been protected by extensions to such rigid armor. Such extensions add considerable weight and cost, and are not easily repaired if damaged.

A preliminary search of prior-art solutions for flexible conduit armor surprisingly revealed only a single U.S. Pat. No. 4,093,004 to Kile et al. They propose the use of multiple layers of cross-lapped oriented polyolefin material. Polyolefin homopolymers include a range of plastics such as polyethylene, polypropylene, ethylene-vinyl acetate, and others. Some polyolefins have excellent flexibility and can be formulated to provide several hundred percent elongation before break, but as these materials have only moderate resistance to being severed by a sharp object such as a shell fragment or armor piercing (AP) bullets, so thick-wall armor is needed to provide reasonable protection, which results in limited flexibility for the conduit to be protected.

Reinforced hydraulic hose made according to SAE standards, for example the multi-layer 100R9 hose, contain one or more layer of wire or fiber braid, and would provide some ballistic protection. However such hoses are optimized to resist internal pressure and are unreliable or limited in resistance to penetration from external ammunition or fragments, especially AP threats.

It is therefore one of the objects of the present invention to obviate the disadvantages of prior art flexible conduit armor and to provide a system which protects the conduit against small-arms fire, splinters, fragments, etc., and yet retains good flexibility of the protected conduit.

It is a further object of the present invention to provide such light weight protection without a substantial weight penalty degrading vehicle performance.

The present invention achieves the above objects by providing an armor system for ballistic protection of a flexible conduit, said system comprising a plurality of protective tubular elements in axial alternating array with double-socket joint elements, the outer peripheral ends of said tubular elements being provided with a convex curvature complementary to a concave curvature provided along the inner peripheral ends of said double-socket joint element, a protective tubular element being inserted in each end of said double-socket joint elements, said curved peripheral end allowing any tubular element connected to a double-socket element to tilt freely relative thereto.

In a preferred embodiment of the present invention there is provided an armor system for ballistic protection of a flexible conduit wherein each tubular element connected to said double-socket element may tilt freely to any angle, i.e. to 25 degrees relative to the axis of said double-socket joint element (see FIG. 2).

In a most preferred embodiment of the present invention there is provided an armor system for ballistic protection of a flexible conduit, wherein said tubular elements comprise at least three layers, said layers being preferably an outer layer being made of a hard, tough grade of steel, a middle layer comprising high strength fibers held in a polymeric binder, and an inner layer comprising a ductile metal tube.

Yet further embodiments of the invention will be described hereinafter.

In contradistinction to the flexible conduit armor disclosed in U.S. Pat. No. 4,093,004 to Kile et al., the present invention can be executed to practically any degree of required flexibility simply by using short rigid tubes and a correspondingly larger number of double-socket elements.

Furthermore, as there is no requirement for flexibility in the protective tubular elements, liberal use of metals and ceramics is possible to provide any desired degree of protection level required.

The fact that the armor of the present invention comprises an axial assembly of individual protective elements, brings further advantages in production and assembly, as well as the convenient options of using a combination of tubular elements of different lengths. For example, a conduit may be required to flex over its middle part but need not flex along the length of its first and last parts. The use of different length tubular elements will meet such requirement. Thus, variable shapes of tube geometry can be protected by the currently invented system.

Maintenance and repair are also greatly facilitated by the use of parts which can be replaced if damaged without there being a need to replace the whole armor system. Armored vehicles are used in situations where ballistic damage can be expected, and while a shell fragment damaging armor of the type described by Kile et al. will necessitate the replacement of the complete armor assembly, in the system of present invention it is only necessary to replace the damaged component or components.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
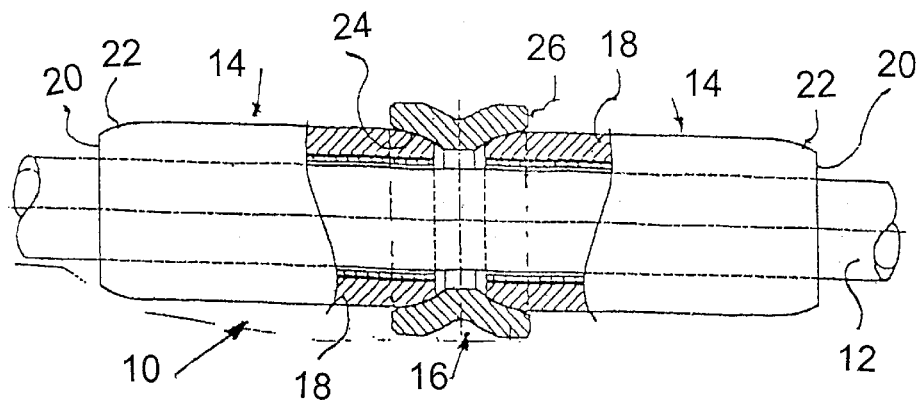
FIG. 1 is an elevations, partially-sectioned view of a preferred embodiment of the armor according to the invention.

There is seen in FIG. 1 an armor system 10 for ballistic protection of a flexible conduit 12, for example the hydraulic line shown in the present embodiment.

The system 10 can be configured to protect conduits from 12.7 mm diameter upwards.

The system 10 comprises a plurality of ballistic resistant protective tubular elements 14 in axial alternating array with double-socket joint elements 16, the figure showing only two tubular elements 14 with a joint element 16 therebetween.

Advantageously, the tubular element 14 comprises at least one layer 18 of ballistic-resistant steel, preferably the outer layer as shown. A layer 18 can be also made of ceramic materials. Heat treated hardened alloy steel is considered particularly suitable and is used also for the double-socket joint elements. 16.

Both outer peripheral ends 20 of tubular element 14 are provided with a convex curvature 22 forming chamfered ends, complementary to and freely engaging a concave curvature 24 provided along the inner peripheral, outwardly flaring, ends 26 of double-socket joint elements 16. A ballistic resistant protective tubular element 14 is inserted in each end 26 of double-socket joint element 16. The curved peripheral end 22 allows any tubular element 14 engaged with a double-socket element 16 to tilt freely relative thereto, as will be seen in FIG. 2.

With reference to the rest of the figures, similar reference numerals have been used to identify similar parts.

Figure 2:
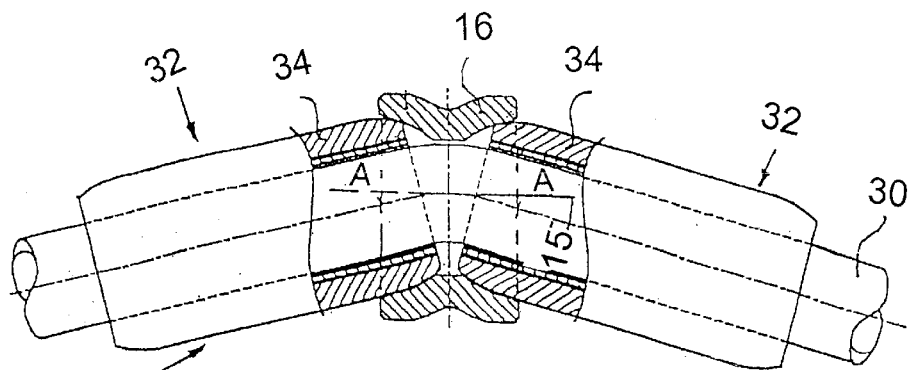
FIG. 2 is an elevations, partially-sectioned view of the armor shown in a flexed position.

Referring now to FIG. 2, there is seen an armor system 28 for ballistic protection of a flexible conduit 30 wherein the tubular element 32 includes a layer, shown here as the outer layer 34, made as layer 18 of FIG. 1 or of a ceramic material in some applications. Ceramics have a significant weight advantage over steel. Suitable ceramic materials include $Al_2O_3$, DIMOX ®, SiC and $B_4C$. While the hard layer of a tubular element 32 is likely to be partially shattered by a direct hit, the damaged tubular element is easily replaced due to the free engagement between tubular elements 14 and joint elements 16.

As seen in the figure, each tubular element 32 connected to the double-socket element 16 may tilt freely to any angle up to 25 degrees relative to the axis AA of double-socket joint element 16. Thus each joint element 16 provides a total of 50 degrees of flex in any direction. In FIG. 2 there is shown 30° of flex.

Figure 3:
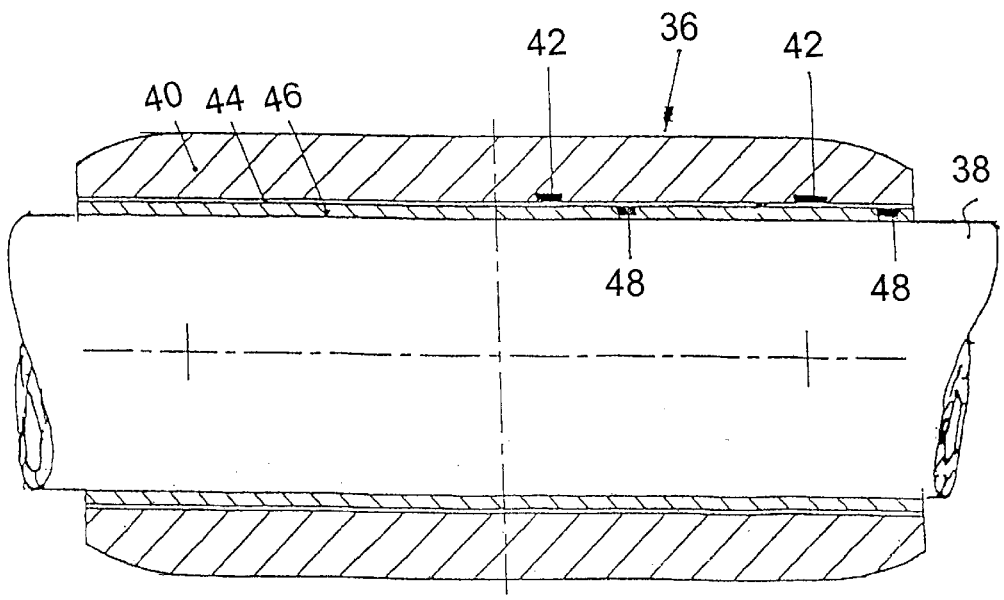
FIG. 3 is a sectional elevational view of a 3-layer protective tubular element.

FIG. 3 illustrates a tubular element 36 for use in an armor system for ballistic protection of a flexible conduit 38.

Tubular element 36 comprises three layers.

An outer layer 40 is made of a hard, tough grade of steel alloy. Suitable candidate steels are those combining a Brinell hardness of over 200 with elongation in 2 in. of over 26%. One such steel is UNS G10400 drawn at 1000 degrees F. or SAE 4140 which will be heat treated (quenched and tempered) to more than 50° C.

A middle layer comprises high strength fibers 44 held in a polymeric binder. Preferably the high strength fibers 44 are glass fibers.

An inner layer 46 comprises a ductile metal tube, suitably made of aluminium alloy. The inner layer 46 is intended to absorb sharp edges of a damaged outer layer 40 and prevent sharp edges therefrom penetrating the conduit by controlling the inner trauma or bulge shape.

A preferred arrangement is to have the fibers 44 wound on the inner layer 46 tube, an adhesive 42 being used to attach the outer layer 40 to fibers 44, which fibers 44 are in turn attached to inner layer 46 by adhesive 48.

An armor system which includes tubular elements made according to the present embodiment, for ballistic protection of a 38 mm flexible conduit was tested to resist penetration by AK47 rifle ammunition of any type (including AP), fired at a 10 meter range. The armor system weighed 17 kg per meter length. Thickness of the outer steel sleeve was 10 mm.

Conduits of the same diameter have been protected against 0.3 AP M2 fire at 10 meter range by an armor system weighing 21 kg per meter length.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An armor system for ballistic protection of a flexible conduit, said system comprising a plurality of ballistic resistant protective tubular elements in axial alternating array with double-socket joint elements, the outer peripheral ends of said tubular elements being provided with a convex curvature complementary to a concave provided along the inner peripheral ends of said double-socket joint elements, a ballistic resistant protective tubular element being inserted in each end of said double-socket joint elements, said curved peripheral end allowing any tubular element connected to a double-socket element to tilt freely relative thereto, wherein said tubular elements comprise at least three layers, at least one of which is a steel layer, said double-socket joint elements comprise at least one layer of steel and wherein each tubular element connected to said double-socket element may tilt freely to any angle up to 25 degrees relative to the axis of said double-socket joint element.

2. An armor system for ballistic protection of a flexible conduit according to claim 1, wherein said tubular element comprises at least one layer of ballistic-resistant steel.

3. An armor system for ballistic protection of a flexible conduit according to claim 1, wherein said tubular element comprises at least one layer of a ceramic or cermet material.

4. An armor system for ballistic protection of a flexible conduit according to claim 1, wherein said at least three layers comprise an outer layer made of a hard, tough grade of steel, a middle layer comprising high strength fibers held in a polymeric binder, and an inner layer comprising ductile metal tube.

5. An armor system for ballistic protection of a flexible conduit according to claim 4, wherein said high strength fibers are glass fibers.

6. An armor system for ballistic protection of a flexible conduit according to claim 1, having an inner diameter of 38 mm, which resists penetration by AK47 rifle ammunition of any type fired at a 10 meter range, and which armor system weighs less than 18 kg per meter length.

7. An armor system for ballistic protection of a flexible conduit according to claim 1, having an inner diameter of 38 mm, which resists penetration by 0.3 AP M2 projectiles fired at a 10 meter range, and which armor system weighs less than 21 kg per meter length.

* * * * *